Sept. 16, 1924.

G. LEVESQUE

CRANKING HANDLE FOR AUTOMOBILES

Filed Aug. 4, 1923

1,508,812

INVENTOR
Gustave Levesque,
BY

ATTORNEY.

Patented Sept. 16, 1924.

1,508,812

UNITED STATES PATENT OFFICE.

GUSTAVE LEVESQUE, OF MONTREAL, QUEBEC, CANADA.

CRANKING HANDLE FOR AUTOMOBILES.

Application filed August 4, 1923. Serial No. 655,743.

*To all whom it may concern:*

Be it known that I, GUSTAVE LEVESQUE, a British subject, residing at 10 Laval Ave., in the city of Montreal, Province of Quebec, in the Dominion of Canada, have invented certain new and useful Improvements in Cranking Handles for Automobiles; and I do hereby declare that the following is a true, clear, and exact description of the same.

This invention relates to cranking handles for automobiles and particularly belongs to the class of starting cranks for internal combustion engines.

The main object of this invention consists in constructing the handle part of the crank in a manner to prevent an accidental fracture to the operator, due to the possible sudden back-fire of the engine.

Other advantages will be found hereinafter and illustrated in the accompanying drawings in which:—

Similar reference characters refer to similar parts in all the views.

Figure 1:
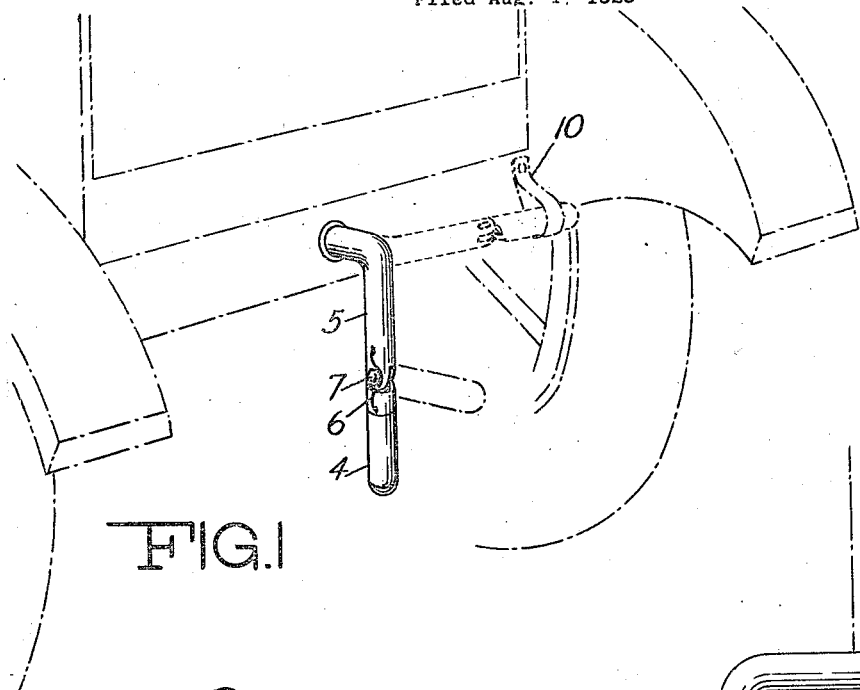
Figure 1 is a diagrammatic view of the front of an automobile illustrating the invention in its various positions.
Figure 3:
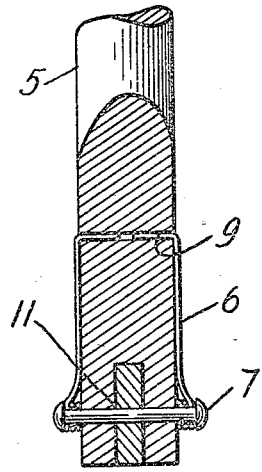
Figure 3 is a vertical section of the handle joint, taken on line 3—3 of Figure 2.
Figure 2:
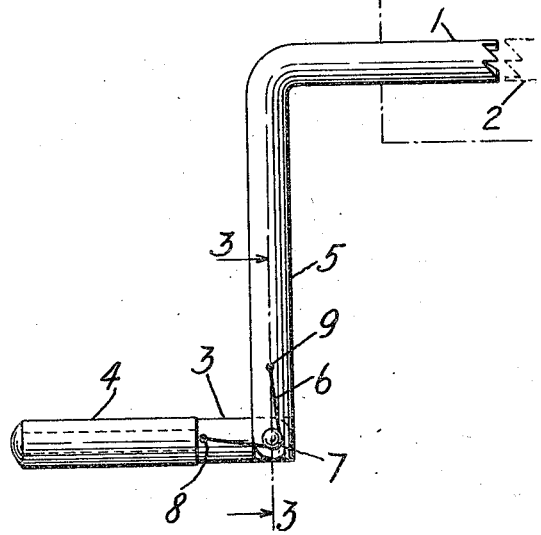
Figure 2 is a side view of the invention shown in cranking position.

All starting cranks generally resemble a Z in form. One end 1 of the main portion of the crank is fitted as a clutch to engage with a corresponding clutch 2 fitted on the end of the engine shaft. The other extremity of the crank is provided with the handle bar 3, which has preferably mounted thereon a loose gripping sleeve 4. This bar 3 is pivoted to the main portion of bar 5 of the crank and a spring 6, wound around the pivot pin 7, has one end secured at 8 to the bar 3 and the other end secured at 9 to the bar 5, holding both bars 3 and 5 normally in alignment as shown in Figure 1. For the purpose of securing the crank when it is desired to keep it on the vehicle, a strap attachment 10 may be fixed to the body of the vehicle and may hold the crank in the position shown in dotted lines in Figure 1.

When cranking the engine, the bar 3 is forcibly turned at right angles to the bar 5, against the resilient action of spring 6. The engine often kicks back, causing a sudden slip of the crank out of the operator's hand and its rapid revolving action is generally the cause of fracture to that which may be in the way of the handle bar 3, when it is at right angle to the bar 5 of the crank. Due to the pivoted mounting 11 of the bars 3 and 5 and the straightening tendency of the spring 6, aside from the centrifugal action upon the bar 3, the revolving crank, immediately released from the operator's hand, will straighten the bar 3 in alignment with the bar 5 and pass all that which remains in the way of the former angular position of bar 3.

I have illustrated herein but one general form of constructing my invention, which may be made in various shapes and may be improved without departing from the spirit and scope of the same.

What I claim as my invention is:—

1. A crank handle for automobiles comprising a bar having a slot at one end, and a portion bent at right angles provided with a clutch at the other end; a pivot pin mounted through said bar at the slotted end; a handle bar mounted in said slot on said pivot pin; and a pair of spring members, each secured at one end in the bar and the other end in the handle bar and in its intermediate portion wound around said pivot pin in order to force the handle bar in alignment with said bar.

2. A crank handle comprising a bar having a slot at one end; a pivot pin mounted in and through said bar at the slotted end; a handle bar mounted in said slot on said pivot pin; and a spring secured at one end in the bar and the other end in the handle bar, the intermediate portion being wound around said pivot pin in order to force the handle bar in alignment with said bar.

Signed at Montreal, Quebec, Canada, this seventh day of July, 1923.

GUSTAVE LEVESQUE.

Witnesses:
J. A. CHOQUETTE,
E. COURTOIS.